W. McCONWAY.
CAR WHEEL.
APPLICATION FILED APR. 14, 1909.
946,995.
Patented Jan. 18, 1910.
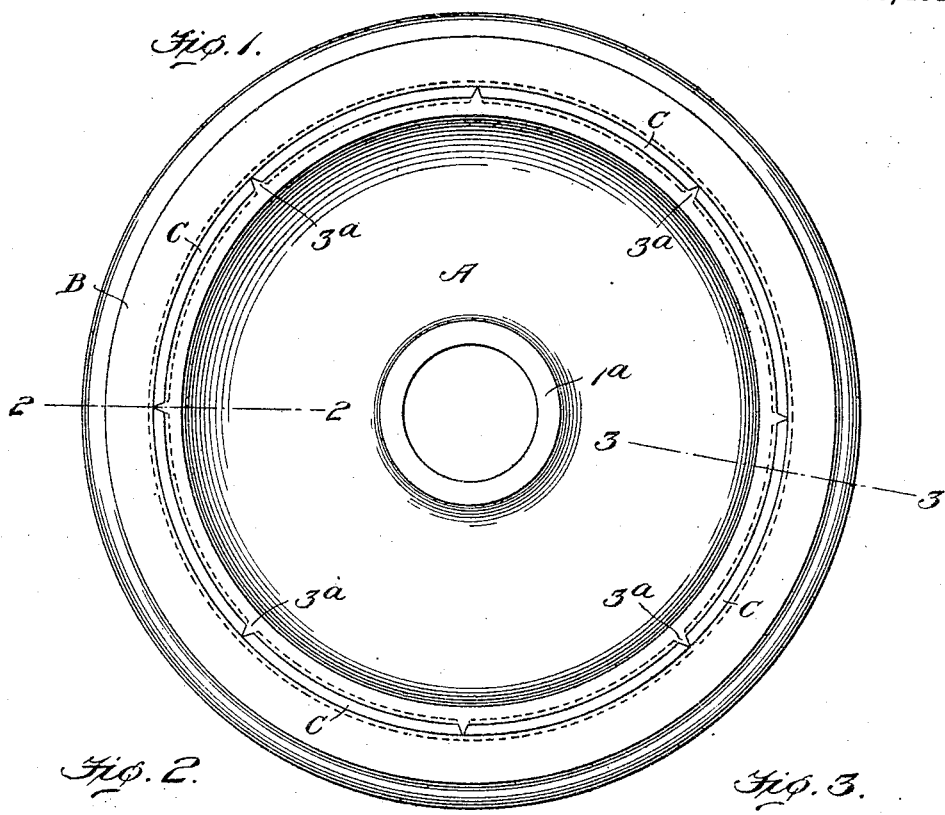
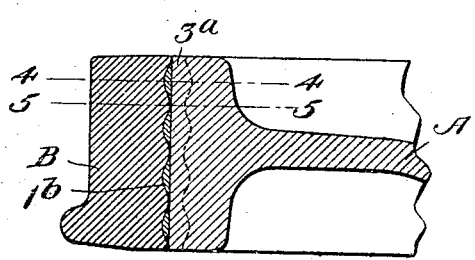
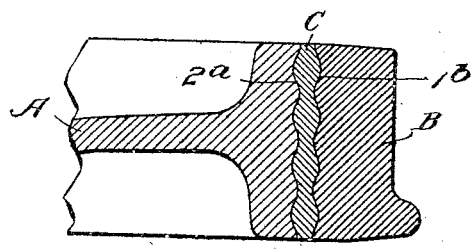
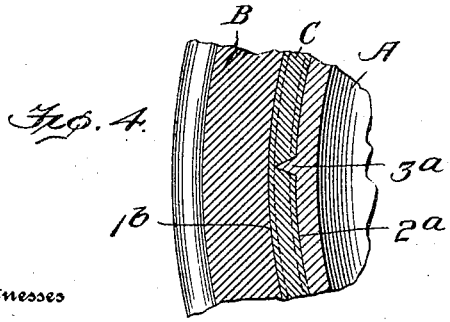
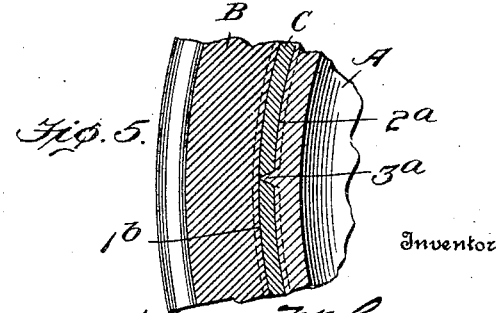
Witnesses
Edwin L. Bradford
Inventor
William McConway
By F. W. Ritter Jr.
Attorney

UNITED STATES PATENT OFFICE.

WILLIAM McCONWAY, OF PITTSBURG, PENNSYLVANIA.

CAR-WHEEL.

946,995.   Specification of Letters Patent.   Patented Jan. 18, 1910.

Application filed April 14, 1909. Serial No. 489,841.

*To all whom it may concern:*

Be it known that I, WILLIAM McCONWAY, a citizen of the United States, residing at Pittsburg, in the county of Allegheny and State of Pennsylvania, have invented certain new and useful Improvements in Car-Wheels; and I do hereby declare the following to be a full, clear, and exact description of the invention, such as will enable others skilled in the art to which it appertains to make and use the same.

My invention relates to the construction of wheels which are especially suitable for use upon railway vehicles of all classes, and is particularly directed to the structural features of such a wheel.

The object of the present invention is to increase the strength and durability of car wheels, and to produce cheap and simple car wheels which are of a composite or built up character.

In practicing my invention I employ a wheel center having a circumferentially channeled periphery which is divided into sections or segments by a series of independent, peripheral projections which extend radially outward from said channeled segments sufficiently far to approximately fit the inner circumference of least diameter of the tire which is to be applied thereto. The tire, which is also channeled on its inner circumference, is heated and placed in proper relation to the wheel center, and molten metal is then poured into the annular space between the wheel center and tire. As the segmental spaces formed between the wheel center, tire and radially extending, peripheral projections are not wholly independent, but communicate through the openings between the inner channeled circumference of the tire and the outer ends of the said peripheral projections, the metal thus cast in place forms a continuous ring at the completion of the casting operation. As this cast filling ring shrinks in cooling, it breaks at the points of weakness opposite the outer ends of the radially extending projections with which the wheel center is provided, thus forming into independent segmental fillers. The further cooling of these cast segmental filling members causes a shrinkage in the length thereof sufficient to permit them to be forced radially inward between the peripheral projections of the wheel center under the influence of the pressure due to the shrinkage of the tire. As the wheel center is maintained at a low temperature and as the tire is properly heated to maintain intimate contact with the cast segmental fillers during their shrinkage, the shrinkage of the tire compensates for the shrinkage of the fillers, and the latter ultimately have intimate contact with the peripheral face of the wheel center as well as with the inner circumferential face of the tire, said tire and wheel center being thus tightly secured to each other.

In the drawings chosen for the purpose of illustrating my invention, the scope whereof is pointed out in the claims, Figure 1 is a side elevation of a car wheel constructed in accordance with my invention; Fig. 2 is a detail radial section, taken in the plane of the line 2—2, Fig. 1; Fig. 3 is a detail radial section, taken in the plane of the line 3—3, Fig. 1; Fig. 4 is a detail, vertical section, taken in the plane of the line 4—4, Fig. 2; and, Fig. 5 is a detail, vertical section, taken in the plane of the line 5—5, Fig. 2.

Like symbols refer to like parts wherever they occur.

I will now proceed to describe my invention more fully, so that others skilled in the art to which it appertains may apply the same.

In the drawings, A indicates the center member or wheel center, B the tire, and C the cast, segmental fillers by which these parts are secured to each other. For the sake of strength, the wheel center is preferably formed of cast steel; in order to secure both strength and durability, the tire is preferably of rolled steel; and in order that the segmental fillers shall not be appreciably compressed under the pounding action of service, which would result in the connection between the tire and wheel center becoming loose, said fillers are preferably formed of cast iron.

The wheel center A is formed with a hub $1^a$, and its peripheral face $2^a$ is preferably channeled to have socketed engagement with the segmental fillers C. As shown more particularly in Figs. 1, 2 and 3, it is preferred that the peripheral face $2^a$ shall be provided with a plurality of parallel, circumferentially extending, circular channels the centers of which lie in the axis of the wheel.

The circumferentially channeled peripheral face $2^a$ of the wheel center is divided into separate segments by a series of peripheral projections 3ª which extend radially outward at preferably regular intervals from said channeled segments sufficiently far to fit approximately into the inner, clear, circular opening of the tire B. These peripheral projections 3ª are, as shown, preferably formed with sides which taper or converge in a radially outward direction, the taper being such that the inclined sides meet in a thin edge at the outer end of each of said projections. By such a construction of the peripheral projections 3ª, the segmental spaces formed between the channeled periphery of the wheel center A and the inner circumferential face of the tire B before the fillers C are cast in place are rendered wedge-like in form, and the fillers C, when cast, are insured a corresponding inward taper.

The tire B, which is concentrically arranged with respect to the wheel center A, is preferably formed with continuous, circular channels on its inner circumferential face 1ᵇ which correspond with the circumferentially extending segmental channels on the periphery 2ª of the wheel center. The clear opening in the center of the tire is preferably such that the radial spurs or peripheral projections 3ª of the wheel center contact or closely approach the tire in the completed wheel. The tread of the tire may be of the usual or any desired form.

The independent, metal fillers C, which are cast in place between the wheel center A and tire B, conform to the opposed, channeled faces of the said wheel center and tire and have socketed, interlocking engagement with each, as will be readily understood.

When a heated tire of the form described is placed in proper relation with a wheel center of the construction pointed out, and molten cast iron is poured in the segmental spaces formed between said wheel center and tire, the shrinking of the tire, following the rupture of the cast iron filling ring into independent fillers C, as before described, forces said fillers, as they continue to shrink in cooling, between the inclined faces of adjacent peripheral projections 3ª, thus compensating for looseness due to shrinkage and insuring intimate contact of each of the fillers C with the wheel center A and tire B.

Having thus described my invention, what I claim and desire to secure by Letters Patent is:

1. In a car wheel, the combination with a wheel center provided with a channeled periphery which is divided into sections by peripheral projections, of a tire which is continuously channeled on its inner circumference, and means interposed between and connecting said wheel center and tire, said means having socketed engagement with the channeled periphery of the wheel center and with the channeled inner circumference of the tire.

2. In a car wheel, the combination with a wheel center which is provided with a plurality of radially extending peripheral projections, of a tire of uniform cross section adapted to encircle said wheel center, and fillers interposed between said wheel center and tire.

3. In a car wheel, the combination with a wheel center provided with tapering peripheral projections, of a tire adapted to encircle said wheel center, and fillers interposed between said wheel center and tire.

4. In a car wheel, the combination with a wheel center provided with a channeled periphery which is divided into segments by radially extending peripheral projections having inclined faces, of a tire which is channeled on its inner circumference, and cast metal fillers interposed between said wheel center and tire and having socketed engagement with each.

5. In a car wheel, the combination with a wheel center, of a tire of uniform cross section encircling the same and arranged in spaced relation thereto, one of said members being provided with projections extending toward the other, and means interposed between and connecting said wheel center and tire.

6. In a car wheel, the combination with a wheel center having a channeled periphery, of a tire arranged in spaced relation thereto and having a continuously channeled inner circumferential face, one of said members being provided with projections extending toward the other and substantially bridging the space between them and a metal filling cast in place between said wheel center and tire and having socketed engagement with each.

In testimony whereof I affix my signature, in presence of two subscribing witnesses.

WILLIAM McCONWAY.

Witnesses:
F. D. ECKER,
J. W. HARTLEY.